(12) United States Patent
Lemoine et al.

(10) Patent No.: US 8,110,109 B2
(45) Date of Patent: Feb. 7, 2012

(54) BIOLOGICAL WATER TREATMENT BY ALTERNATING CONTINUOUS AND SEQUENTIAL AERATION

(75) Inventors: Cyrille Lemoine, Sartrouville (FR); Patricia Grelier, Sartrouville (FR)

(73) Assignee: OTV SA, Saint-Maurice Cedex (FR)

( * ) Notice: Subject to any disclaimer, the term of this patent is extended or adjusted under 35 U.S.C. 154(b) by 349 days.

(21) Appl. No.: 12/516,642

(22) PCT Filed: Dec. 7, 2007

(86) PCT No.: PCT/EP2007/063536
§ 371 (c)(1),
(2), (4) Date: Jul. 14, 2009

(87) PCT Pub. No.: WO2008/068335
PCT Pub. Date: Jun. 12, 2008

(65) Prior Publication Data
US 2010/0065494 A1 Mar. 18, 2010

(30) Foreign Application Priority Data
Dec. 8, 2006 (FR) ..................................... 06 10738

(51) Int. Cl.
*C02F 3/30* (2006.01)
(52) U.S. Cl. .................. 210/630; 210/614; 210/903
(58) Field of Classification Search .............. 210/605, 210/614, 630, 903
See application file for complete search history.

(56) References Cited

U.S. PATENT DOCUMENTS

| 5,589,068 | A | * | 12/1996 | Nielsen | 210/614 |
| 6,007,721 | A | * | 12/1999 | Payraudeau et al. | 210/614 |
| 2005/0252855 | A1 | * | 11/2005 | Shieh et al. | 210/605 |
| 2005/0279704 | A1 | * | 12/2005 | Miklos | 210/605 |

FOREIGN PATENT DOCUMENTS

| FR | 2764817 | 6/1997 |
| WO | 93/07088 | 4/1993 |
| WO | 9307088 | 4/1993 |
| WO | 9307089 | 4/1993 |
| WO | 0102306 | 1/2001 |
| WO | 2006000680 | 1/2006 |

* cited by examiner

*Primary Examiner* — Fred Prince
(74) *Attorney, Agent, or Firm* — Coats & Bennett, P.L.L.C.

(57) ABSTRACT

A method of biologically treating water and more particularly, a process for nitrifying and denitrifying water includes employing a continuous aeration mode and a sequential aeration mode. In the continuous aeration mode, nitrification and denitrification reactions occur simultaneously in the water. The continuous aeration mode occurs when the nitrate concentration of the water reaches a predetermined low threshold. The sequential aeration mode occurs when the nitrate concentration reaches a predetermined high threshold. When in the sequential aeration mode, aeration is ceased when the ammoniac concentration reaches a predetermined low threshold and aeration is activated when the ammoniac concentration reaches a predetermined high threshold.

30 Claims, 8 Drawing Sheets

BIOLOGICAL WATER TREATMENT BY ALTERNATING CONTINUOUS AND SEQUENTIAL AERATION

This application is a U.S. National Stage Application of PCT Application No. PCT/EP2007/063536, with an international filing date of 7 Dec. 2007. Applicant claims priority based on French Patent Application No. 06/10738 filed 8 Dec. 2006. The subject matter of these applications is incorporated herein.

This invention relates to the water treatment field. More specifically, it relates to treatments of urban or industrial effluents by a process for removing the nitrogen and carbon pollution by means of a biomass in free culture or attached to a solid material.

A classic technique for removing pollution from water uses a biological reactor such as a biofilter or an activated sludge.

According to this technique, the reactor is aerated so as to ensure the treatment of the pollution. However, the level of this aeration must be properly controlled in order to enable two opposing reactions to coexist in the same reactor: one requiring oxygen, nitrification (N) and the other requiring the absence thereof, denitrification (DN). Indeed, the greater excess of available oxygen in the reactor, the more denitrification is inhibited, and vice versa.

Thus, the overall efficiency of the pollution removal process is directly dependent on the adjustment of the aeration.

In the process of the prior art, in order to adjust the aeration of the biomass according to the pollution to be treated, measurements of given parameters are obtained in the reactor, or at the outlet thereof. These measurements are intended to determine the state of the system at a precise time. On the basis of this state, a gas flow rate is calculated, then applied. It is usually a measurement of ammonium, nitrates, oxidation-reduction potential or dissolved oxygen . . . . Other parameters, which can be called "composites" are also used. These involve linear combinations of the variables measured.

Thus, in the context of the urban wastewater treatment process, the polluting load indicator (mass of N—NH4 in kilograms per cubic meter of aerated reactor and per day) has already been validated as data useful for the process.

Indeed, the patent application published under number WO 01/02306 A1 defines an estimator of this polluting load based on measurements of conductivity and turbidity.

However, it involves an estimation and not a direct measurement. So in the case of regulation requiring a high degree of accuracy, it is not possible to use such tools.

One of the justifications for using such estimators is the cost of purchasing and maintenance of specific analyzers. It is therefore understood that this low cost is accompanied by very limited performances.

At present, various types of regulation strategies are distinguished in the prior art.

According to one of these regulation strategies, the efficiency of use, by the biomass, of the distributed oxygen "Ct" for regulating the gas flow is calculated. This is described by the patent published under number FR 2 764 817.

This technique requires the use of a reference Ct which is itself dependent on the pollution to be treated. However, the difficulty lies in the fact that the polluting load varies over time and that this reference Ct must be changed regularly so as always to be consistent, thus ruling out the use in the case of a highly variable effluent.

Other techniques use linear combinations of input variables of the system (ammonium, nitrates, etc.) in order to calculate the airflow rate control to be applied, as described in particular in the international application published under number WO 93/07089.

However, these techniques are based on empirical or semi-empirical modeling. The control functions used are based essentially on the data resulting from previous operations. If the model is unsuitable due to the change in the biomass or the performances of the filter, the aeration is then no longer optimal.

Notable improvements are obtained by using input measurements of the system in order to estimate the control value to be applied. However, this always involves sequential aeration.

The prior art has also proposed control systems using a so-called "Feedback/Feedforward" regulation loop (which can also be called a counter-reaction loop/trend loop).

According to one approach to these systems, some authors propose strategies intended to control the dissolved oxygen concentration in the biological reactor by using a measurement of ammonium at the inlet.

According to another approach, the concept of the ammonium load to be treated is used to predict the necessary change in the dissolved oxygen set point.

According to other techniques, the regulation of the aerated volume is based on a compartmentalization of the reactor (and not on the regulation of a gas flow rate or speed). However, the basically discrete nature (discontinuous variation in the aerated volume) of this type of strategy leads the authors to always complete their system by regulating the dissolved oxygen.

Another aeration mode exists: this involves simultaneous aeration. This mode consists of enabling the two opposing reactions of nitrification and denitrification to coexist in the same reactor at the same time and in the same space.

However, the level of this aeration must be properly controlled in order to maintain the reaction equilibrium.

This last mode has been described in the patent document published under number WO-2006/000680 and appears to be more effective and better performing than the aeration modes described earlier.

However, in very high polluting load peaks during the day (polluting load: flow rate multiplied by the concentration of pollutant), the metastable equilibrium obtained is weakened and a decrease in denitrification performances and therefore a decrease in the performances of the process are observed.

The invention is intended in particular to overcome the disadvantages of the prior art.

More specifically, the invention is intended to propose an aeration technique in the context of the biological water treatment processes using an aerated biomass that is high-performing under all circumstances, in particular independently of the polluting load peaks that can occur.

The invention is also intended to provide such a technique that can be implemented easily, including on existing installations.

These objectives, as well as others which will appear below, are achieved by the invention, which relates to a process for treating water using a biological reactor in order to diminish the nitrogen pollution in said water, in which said reactor integrates a biomass aerated by aeration means, and said treatment includes simultaneous nitrification/denitrification phases, characterized in that said treatment alternately implements two aeration modes:
  a so-called continuous aeration mode;
  a sequential aeration mode in which the aeration is stopped when the ammoniac concentration reaches a predetermined low threshold and the aeration is activated when the ammoniac concentration reaches a predetermined high threshold, the switch from one aeration mode to the other is activated according to the nitrate concentration in said water, said so-called continuous aeration mode being activated when said nitrate concentration reaches a predetermined low threshold, and said sequential aeration mode being activated when said nitrate concentration reaches a predetermined high threshold.

Thus, the invention proposes automatically switching the aeration mode according to operating constraints (treatment of pollution arriving at the plant), thus enabling the efficiency of the nitrogen and carbon pollution removal process to be optimized.

The automatic choice of the aeration mode most suitable for the polluting load applied to the biological reactor is made according to treated water quality criteria, in particular according to the nitrate concentration.

In addition, the invention enables regulator set points associated with each of these modes to be defined, thus helping the operator to optimize the treatment process.

The use of a higher-level regulator introducing the notion of choice into the regulation mode and set points to be applied to the lower regulator is clearly original.

Indeed, even though those skilled in the art know the various possible types of aeration regulation, there have not heretofore been tools enabling the aeration modes used as well as the set points thereof to be continuously varied.

On the contrary, these control strategies (continuous aeration and sequential aeration) until now have been mutually exclusive.

This invention proposes a technical solution enabling the strategy most suitable over time to be applied. This is determined according to the nitrate concentration resulting from the treatment. It also enables the optimal treatment concentration for ammoniac to be determined according to the formation of nitrates. Those skilled in the art know that it is possible to simultaneously establish a treatment set point on the ammoniac and on the nitrates formed, while their sum represents an overall pollution indicator. It is commonplace for the sequential or continuous aeration modes to use an ammoniac (NH4) set point established by the operator, who determines the desired nitrogen pollution treatment level: total nitrogen contained in the treated water.

This invention determines, by the calculation, the ammoniac set point that minimizes the total nitrogen concentration defined as the sum of the nitrates and the ammoniac.

According to preferred parameters, said so-called continuous aeration mode is activated when said nitrate concentration decreases to a threshold of around 4 mg/l and said sequential aeration mode is activated when said nitrate concentration increases to a threshold of around 10 mg/l.

Of course, these thresholds can be modified as needed.

Advantageously, the aeration, during said sequential aeration mode, is limited over time by a timing system.

Also advantageously, the stopping of the aeration, during said sequential aeration mode, is limited over time by a timing system.

According to a preferred solution, said continuous aeration mode involves a method of predictive control of the nitrate and ammoniac concentrations in said water.

Such a method, with the corresponding algorithm, has already been used in the context of a NH4/02/Air cascade loop for a simultaneous NDN regulation, and it was demonstrated at that time that the performances were suitable for this type of problem.

According to an advantageous solution, said predictive control method includes successive steps of regulating an ammoniac set point to be reached according to a nitrate set point to be reached.

According to another advantageous feature, said predictive control method also includes successive steps of regulating an aeration set point when said nitrate concentration reaches a predetermined high threshold.

In this case, said steps of regulating said ammoniac set point and said steps of regulating said aeration set point are advantageously timed, and preferably staggered over time with respect to one another.

Other features and advantages of the invention will become clearer on reading the following description of a preferred embodiment of the invention, given purely for illustrative and non-limiting purposes, and the appended drawings in which.

The principle of the invention lies in the implementation of an automated management of the aeration mode of a biological treatment process for urban or industrial wastewater, in which the aeration is alternately continuous or sequential.

The regulation used is based on the nitrate and ammoniac line measurements in the activated sludge tank. This involves, according to the embodiment to be described below, measurements taken from the treated water since the use of membrane filtration enables the treated water to be considered representative of the tank. Indeed, the tank is then similar to a perfectly agitated reactor. The variable controlled (manipulated) is the air flow rate in the pilot.

The strategy applied uses the principle of hierarchical control: the main control relates to the choice of the type of aeration: sequential or continuous. The secondary controls correspond to the ad hoc regulation systems for achieving the desired type of aeration.

The principle of management 1 of the aeration modes (FIG. 1) is to use the nitrate concentration measurement 2 as an indicator of the polluting load applied to the station.

Figure 1:
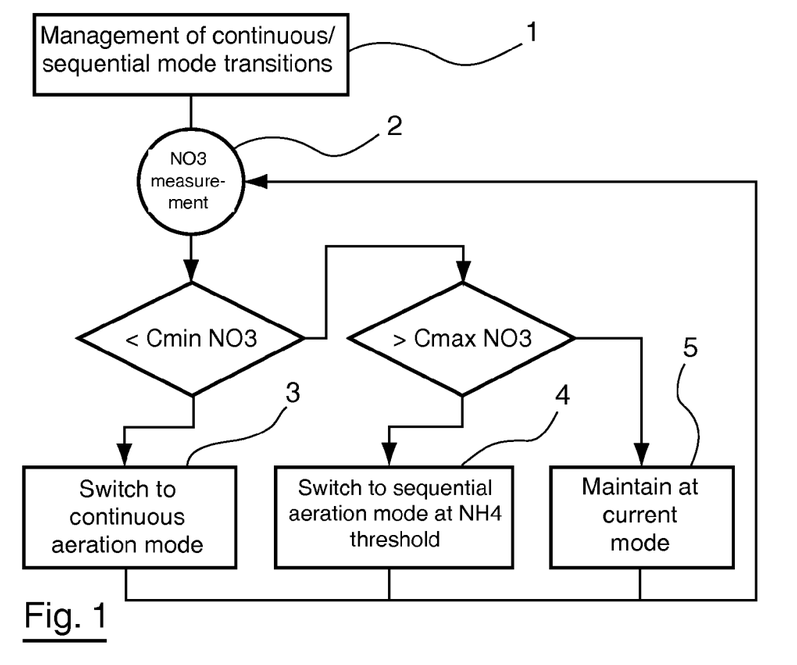
FIG. 1 is a diagrammatic drawing of the switch from one aeration mode to another in a process according to the invention.

If the regulator managing the continuous aeration complies with the ammoniac set point, the nitrate concentration will reveal the treatment capacities and enable the system's capacity to work in simultaneous nitrification/denitrification to be evaluated.

Indeed, insofar as the aeration necessary in order to comply with the ammoniac set point does not inhibit denitrification, the nitrate concentration remains low and the process implements a continuous aeration mode 3.

Conversely, if the aeration must be high in order to meet the aforementioned requirements, the increase in dissolved oxygen degrades the denitrification kinetics and the nitrate concentration rises rapidly.

Thus, when an accumulation of nitrates is observed, it usually corresponds to a polluting load peak and it is preferable to switch to sequential mode because the biological tank no longer has satisfactory conditions for simultaneously performing nitrification and denitrification.

Of course, if the mode in progress is sequential aeration, a measurement of the nitrate concentration above the threshold corresponding to a peak causes the mode in progress to be maintained 5.

In practice, the strategy consists of implementing a system for managing aeration modes by means of high and low nitrate levels (hysteresis) and timings (minimum and maximum times) for each mode. As an example, the thresholds validated on the pilot are:

low threshold=4 mg N—NO$_3$/L;
high threshold=10 mg N—NO$_3$/L.

Each of the aeration modes will now be described in greater detail.

The sequential aeration treatment 4 is performed as follows (FIG. 2): it also involves management at the high 42 and low 43 thresholds, but with the ammoniac measurement 41 in order to activate 44 and stop 45 the aeration (hysteresis) to which the minimum and maximum timings are added in the event of failures.

Figure 2:
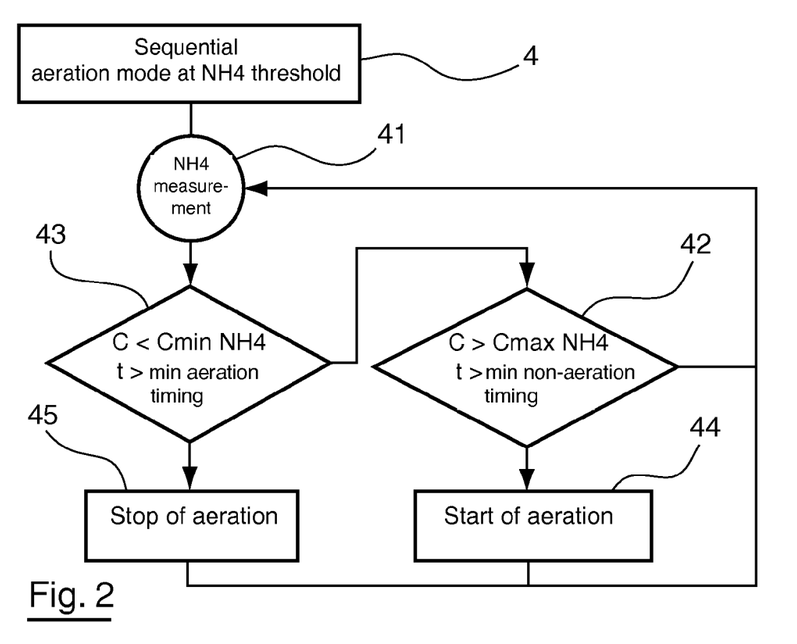
FIG. 2 is a diagrammatic drawing of the sequential aeration mode in a process according to the invention.

This mode of operation can be applied to stations equipped solely with aerators without a variator for a classic NDN. The direct measurement of the pollution through the ammoniac measurement enables the process to be conducted more reactively and simply.

Figure 3:
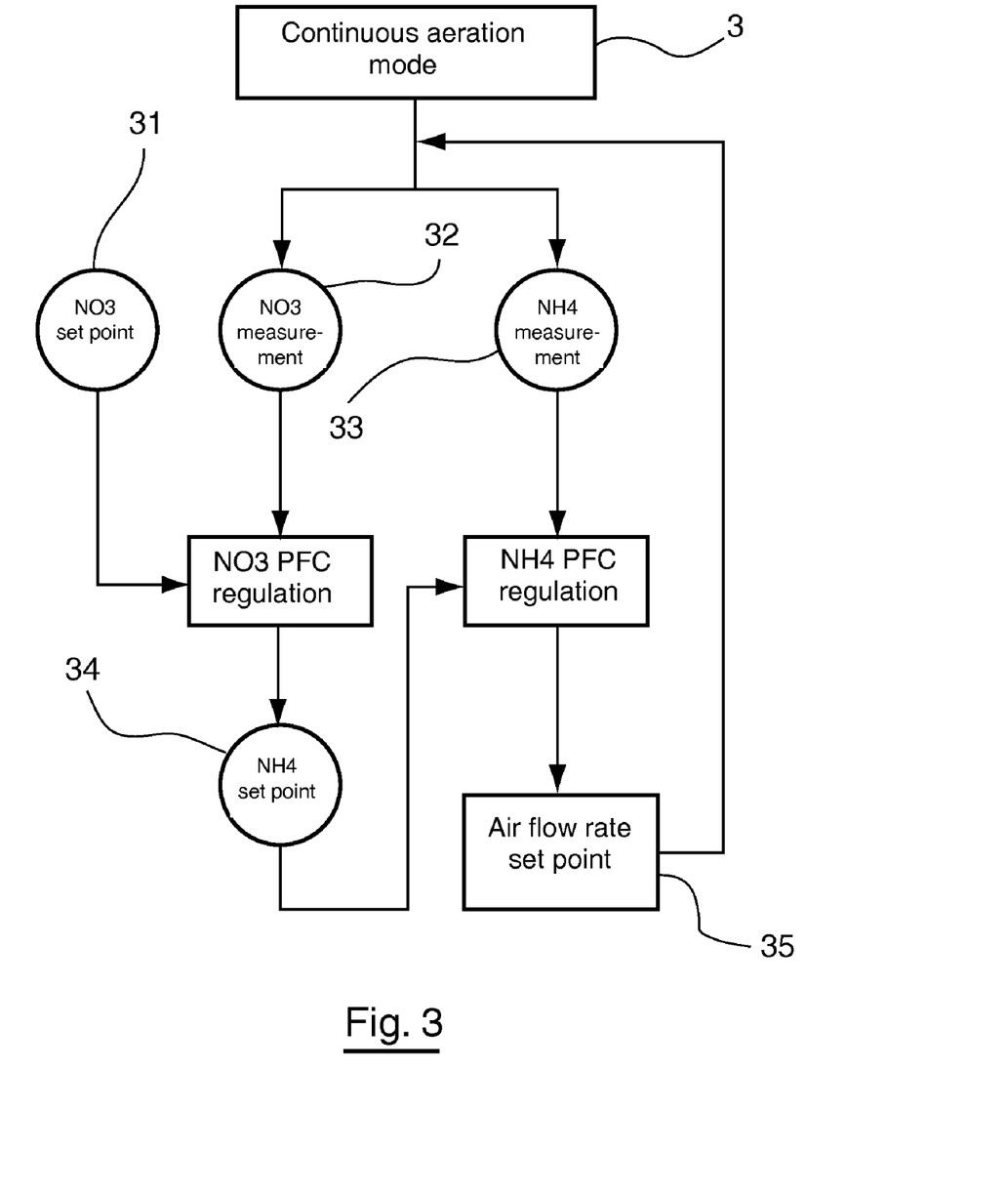
FIG. 3 is a diagrammatic drawing of the continuous aeration mode in a process according to the invention.

The continuous aeration regulation strategy for performing simultaneous nitrification/denitrification (NDNs) consists in using a cascade of so-called PFC (Predictive Functional Control) regulators. The detail of the regulator is described below.

FIG. 3 shows the operation of the control loop.

A first regulator calculates what is to be the ammoniac set point 34 to be reached within a range of between 1 to 4 mg-N—NH$_4$/L according to the nitrate set point 31 to be complied with, which is chosen from between 3 and 6 mg-N—NO$_3$/L. It involves indirectly maintaining a balance between the nitrification and denitrification reactions according to the polluting load applied, with the measurement of ammoniac 33 and nitrate 32 concentrations similarly changing.

In this case, it is hypothesized that when the load increases, the nitrates increase, which means a decrease in the denitrification (DN) efficiency and an increase in the nitrification (N) efficiency, causing the overall efficiency (NDNs) to decrease.

The strategy is then to be less strict regarding the ammonium of the treated water and to allow a higher residual level. In fact, an attempt is made to restore the equilibrium of the N and DN efficiencies, and the controller modifies the point of operation 35 of the process (air decrease) in order to reach a new optimum.

Conversely, when the load decreases, it is possible to enable a better quality of treated water without reducing the denitrification efficiency. It is necessary to note that the two regulators do not operate at the same rate, so as to avoid instability of the system. The regulator for NO$_3$ modifies the ammoniac set point every quarter of an hour, and that of the NH4 every minute.

This algorithm, described by J. Richalet (J. Richalet (1993) "Pratique de la commande predictive" ["Predictive control procedure"] "HERMES Publishing") was published in the context of a first-order system with a constant gain; however a variable gain can be used depending on the case. One of the special features of this control is the notion of a reference trajectory. It specifies the way in which the process is to be associated with the set point at the prediction level. This amounts to establishing a plurality of coincidence points simultaneously. Most of the time, a first-order dynamic is chosen for the return to the set point.

In the case of the invention, it is desirable for the deviation to follow an exponential decrease with a time constant set by the operator.

Another important feature is the free change of the model: it is independent of the change in the process, thus enabling the recursive nature of the transfer functions to be exploited, and therefore the calculations to be limited.

The expression of the control is described below.

Equation 1: PFC Control $$S_m(n) = S_m(n-1) \cdot e^{\frac{T_e}{\tau}} + G_s \cdot (1 - e^{\frac{T_e}{\tau}}) \cdot u(n-1)$$

$$u(n) = \frac{1}{G_s}(k_0(S_p(n) - C(n)) + S_m(n))$$

The integration of this regulator is easy because, aside from the identification of the model, there is only one adjustment parameter $k_0$ defined as the OLRT (Open Loop Response Time, i.e. without regulation) over the CLRT (Closed Loop Response Time, i.e. regulation activated). The optimum $k_0$ is generally 3.

Another expression of the control exists if the system to be controlled has a pure delay $\theta = r \cdot Te$.

Equation 2: PFC Control with Pure Delay $$u(n) = \frac{1}{G_s}(k_0(S_p(n) - C(n) + S_m(n-r) - S_m(n)) + S_m(n+r))$$

The PFC algorithm is simpler to apply than the PID (Proportional Integral Derived regulator), but much more effective. This algorithm has already been used in the context of a NH4/O2/Air cascade loop for a simultaneous NDN regulation (patent document published under number WO-2006/000680), it was demonstrated at that time that its performance was suitable for this type of problem.

The general principle of the invention can be summarized as follows.

The breakdown of nitrogen pollution involves two reactions: nitrification and denitrification. Nitrification is an aerobic reaction that causes NH$_4$ to be converted into NO$_3$. Denitrification is an anoxic reaction that causes NO$_3$ to be converted into gaseous N$_2$.

The invention consists in improving the treatment of nitrogen pollution by alternating a continuous aeration mode in which these two reactions occur simultaneously (during the same period and in the same space) and a sequential aeration mode alternating non-aeration phases and aeration phases and during which these reactions occur alternately. The switch to sequential mode occurs when the NO$_3$ concentration of the effluent treated reaches a predetermined high threshold. In sequential mode, the aeration is stopped when the NH$_4$ concentration of the effluent treated reaches a predetermined low threshold and the aeration is activated when the NH$_4$ concentration of the effluent treated reaches a predetermined high threshold.

Insofar as the aeration necessary for nitrification, i.e. breakdown of $NH_4$ into $NO_3$, does not inhibit denitrification, the $NO_3$ concentration does not exceed the predetermined high threshold. The system is capable of operating in NDNs (simultaneous Nitrification Denitrification). The continuous aeration mode is then maintained.

An increase in $NO_3$ means a decrease in the denitrification efficiency in favor of an increase in the nitrification efficiency. When the $NO_3$ concentration exceeds this predetermined high threshold, the system is no longer capable of enabling the two reactions to coexist simultaneously, i.e. to operate in NDNs. To restore equilibrium between these two reactions, it is then necessary to activate the sequenced mode so as to alternate denitrification phases and nitrification phases. The system then operates in NDNc (classic Nitrification Denitrification).

On activation of the sequential mode, the aeration is stopped so as to promote the removal of excess $NO_3$ by denitrification. This progressively leads to an increase in $NH_4$ due to the fact that the nitrification is inhibited. When the $NH_4$ concentration reaches the predetermined high threshold, the aeration is activated so as to promote its breakdown by nitrification. When the $NH_4$ concentration is low, meaning that the $NO_3$ concentration has increased, the aeration is again stopped so as to promote denitrification.

The sequential mode alternating denitrification and nitrification phases is maintained until the $NO_3$ concentration reaches the predetermined low threshold. At the end of a nitrification phase, when the low $NH_4$ threshold is reached, if the $NO_3$ concentration measured is below the predetermined low threshold, it means that the system is again capable of operating in NDNs. The continuous mode is then activated.

The system thus switches from one aeration mode to the other once the conditions required for this have been satisfied.

The invention also enables the NDNs to be optimized by implementing a predictive method, the principle of which is summarized below.

The load of raw water, i.e. the concentration of pollutants therein, varies over time. For example, it has been observed that the low of urban wastewater increases during the morning, then decreases during the afternoon to reach a substantially stable level in the evening.

The transition between the rise and fall of the polluting load involves the appearance of a pollution peak that usually corresponds to an accumulation of $NO_3$.

In the continuous aeration mode, an increase in the $NO_3$ concentration shows the inability of the system to operate in NDNs. However, insofar as the $NO_3$ concentration remains below the high threshold, beyond which the sequential aeration mode is activated, the system continues to operate in NDNs. However, the relatively high $NO_3$ concentration indicates that the nitrification efficiency is higher than the denitrification efficiency. In other words, the equilibrium between the two reactions is not optimal.

To overcome this problem, it is appropriate during the pollution peaks to re-equilibrate these two reactions by favoring denitrification while maintaining nitrification, but at a lower efficiency.

The invention thus proposes a solution that helps to optimize the NDNs. This solution consists in implementing a predictive method.

This predictive method consists in giving the operator responsible for implementing the treatment process with the option to change the set point value of $NO_3$ and $NH_4$ concentrations to be reached during the day.

Thus, according to the time of day, i.e. according to the estimated polluting load of the water to be treated, the operator can choose the $NO_3$ set point to be complied with from a range of concentrations. A first PFC regulator calculates, on the basis of the operator's set point, a $NH_4$ set point to be reached. A second PFC regulator determines an aeration set point on the basis of the $NH_4$ concentration set point calculated.

Thus, when the polluting load increases at the peak hours, and the $NO_3$ concentration increases, the operator can choose an $NO_3$ concentration set point higher than in the off-peak period. Subsequently, a $NH_4$ concentration set point to be reached is calculated. The value of this set point is higher in the peak period. In other words, it is tolerated, in the peak period, that the $NH_4$ concentration is momentarily higher. The fact of allowing a higher $NH_4$ concentration leads to a reduction in the nitrification efficiency, and therefore a limit to the formation of $NO_3$ resulting from the breakdown of $NH_4$. This result is achieved by reducing the aeration. The fact of reducing the aeration correspondingly leads to an increase in the denitrification efficiency and thus promotes the breakdown of $NO_3$.

Equilibrium is then maintained between these two reactions, which occur simultaneously so as to reduce the NO3 concentration following a pollution peak. The water thus produced has an optimal quality in consideration of the circumstances. Indeed, the sum of the $NO_3$ and $NH_4$ concentrations, which represents the nitrogen pollution to be removed, is lower.

When the polluting load decreases, the $NH_4$ concentration of the raw water decreases and the $NO_3$ concentration is very low. It then becomes possible to target lower $NO_3$ and $NH_4$ concentrations. The operator can then choose to lower the $NO_3$ concentration set point. The $NH_4$ set point consequently calculated is lowered and the aeration set point increases. The nitrification efficiency consequently increases. However, given that the $NO_3$ concentration is low (off-peak period), the denitrification efficiency is not reduced. The water produced outside of the pollution peaks is thus of higher quality.

The implementation of this predictive method thus enables the capacities of the process for operating in NDNs to be taken advantage of according to the implementation conditions, and in particular according to the variations in the polluting load of the water to be treated. Of course, if the polluting load increases in proportions so that the predetermined high threshold of $NO_3$ is reached, the system cannot operate in NDNs and the sequential mode is activated so that the system will operate in NDNc.

The pilot unit used to perform tests on the process according to the invention will be described below.

Figure 4:
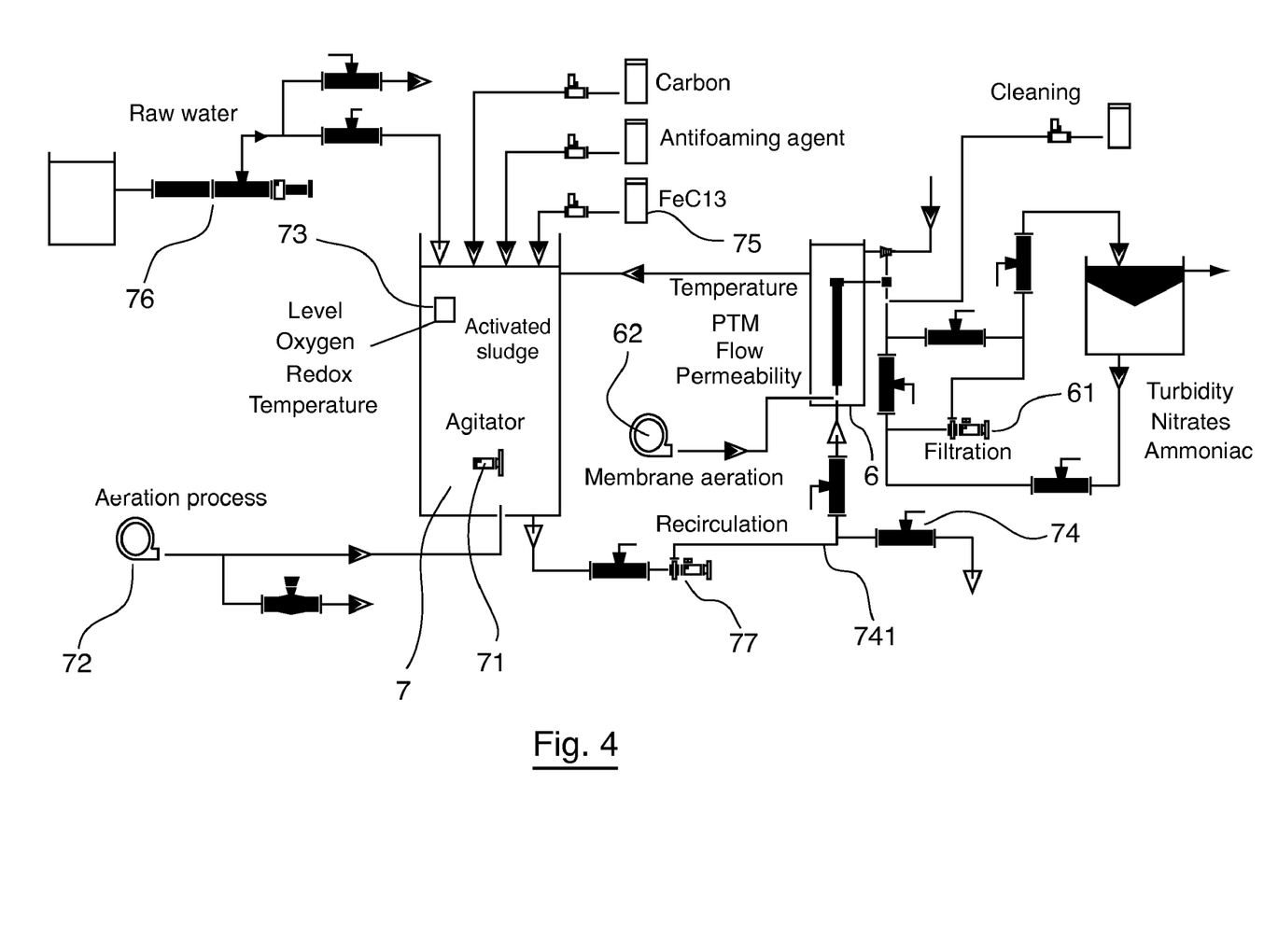
FIG. 4 is a diagrammatic view of a pilot-scale facility for implementing the process according to the invention.

Membrane bioreactors combine separative membrane techniques and biological reactors. The main modification with respect to a classic activated sludge system is the replacement of the clarifier by the membrane filtration unit 6, which ensures the separation of the mixed liquor and the treated water.

The membrane bioreactor is based on a hybrid technology: the filtration module is immersed in a compartment placed on a recirculation loop outside of the biological reactor.

The pilot is directly supplied with urban wastewater. It is first screened at 1 mm on a rotary sieve, then pumped toward the bioreactor. The raw water supply is sequenced according to the level in the column.

The volume of the biological reactor 7 is around 1.7 m$^3$, equipped with an agitator 71 so as to homogenize the activated sludge. The aeration of the tank is ensured by a fine bubble air diffuser 72. The regulation of the air is covered by this invention.

To monitor the dissolved oxygen concentration in the biological reactor, an oxygen probe 73 is immersed in the activated sludge tank.

The sludge purges are performed automatically on opening the purge valve 74 located on the recirculation loop 741 at the inlet of the membrane compartment 6.

The age of the sludge varied over the test period. It was around 16 days old during the entire reference period. For the simultaneous NDN phase, it went from 16 to 22, then 30 days over the course of the period. The main reason for these modifications is the maintenance of a proper level of suspended solids (SS) in the tank associated with a decrease in the sludge production as will be indicated in the results portion.

An injection of iron chloride 75 during the physicochemical phosphate removal is performed directly in the reactor. The flow rate from the injection pump 76 is dependent on the take-off flow rate 77 so as to obtain a constant treatment level.

The membrane module 6, immersed in a membrane compartment, is composed of a set of hollow microfiltration fibers manufactured by Memcor (Australia—registered trademark). The filtration 61 of the mixed liquor is performed by suction, from the top of the module at a take-off flow rate regulated by the automated system. The permeate is stored in a tank used for backwashing operations before being discharged to the sewer. The filtration and backwash cycles (counter-current permeate injection) are respectively 12 minutes and 30 seconds. A large bubble aeration system 62 enables the membrane fibers to be agitated and the formation of a cake at the surface thereof to be limited.

Each week, a maintenance cleaning with chlorine is performed by injecting a counter-current 300-ppm solution.

When the permeability of the membrane reaches a low threshold of around 80 $L \cdot h^{-1} \cdot m^{-2} \cdot bar^{-1}$, chemical cleanings with citric acid are performed.

The membranes are in the form of hollow fibers with an outer skin (filtration from the outside to the inside) assembled in a module representing a filtration surface of 10 $m^2$. Their cut-off threshold is around 0.1 µm.

Results

Simultaneous Nitrification/Denitrification Regulation Alone with a Constant $NH_4$ Set Point.

The tests performed to regulate the ammoniac concentration by a PFC controller (FIG. 5) showed that the capacity to control the air flow rate was satisfactory and that it was therefore possible to obtain an acceptable set point tracking by controlling the amount of air injected.

Figure 5:
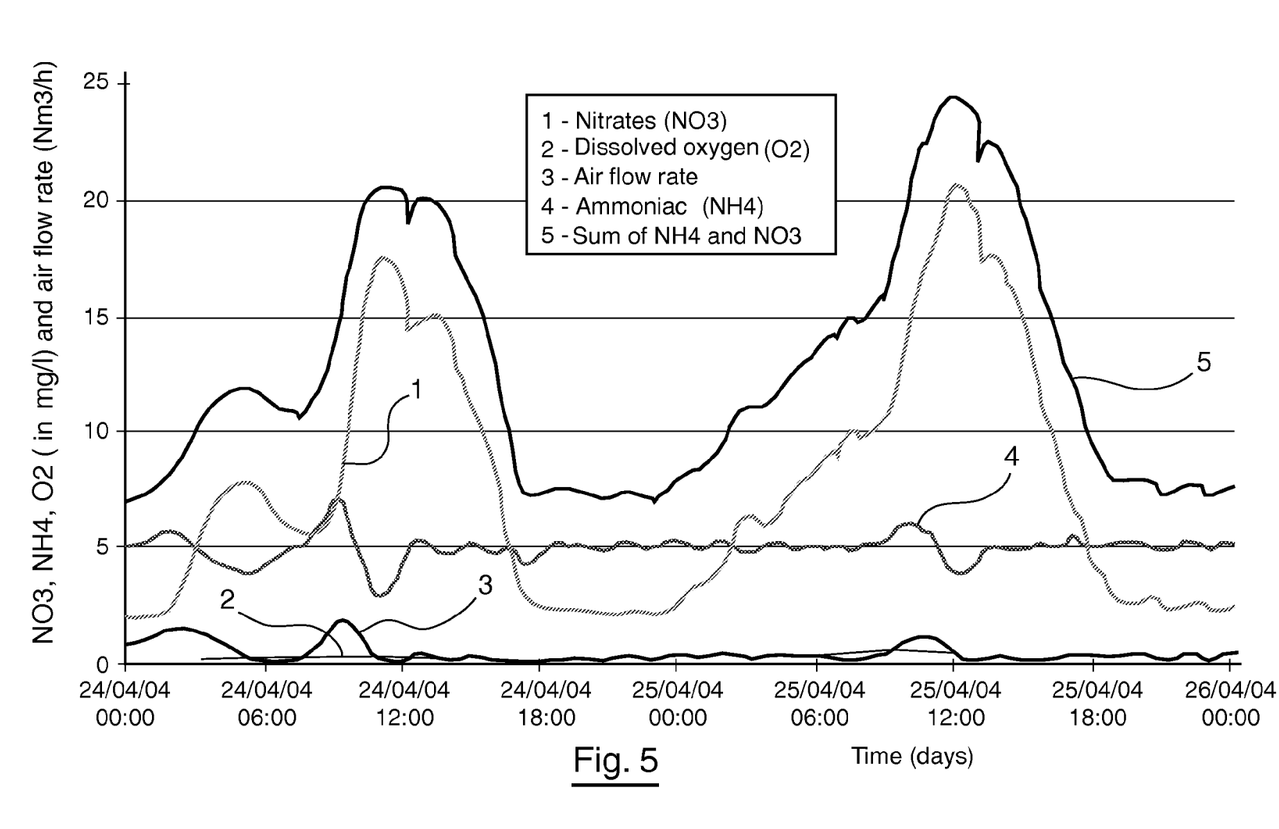
FIG. 5 is a graph showing the simultaneous nitrification/denitrification regulation at a constant NH4 set point.

In addition, it was observed that a feedback system alone can be suitable for this process in order to anticipate variations in the effluent. Indeed, in our example, the flow rate does not vary over the course of the day.

A pumping effect can be noted during the peak, which may be disruptive if the supply flow rate were eminently variable, and this point would be set by using the control described in the patent document published under number WO-2006/000680.

It is also observed that the dissolved oxygen concentration is almost zero during the treatment, with a maximum of 0.3 $mg-O_2/L$. The absence of residual oxygen, in spite of several occasional peaks, is a good indicator of the efficiency of the simultaneous NDN control process.

However, the nitrate concentrations remain high during the polluting load peaks. It is therefore necessary to adjust the ammoniac set points so as not to inhibit the denitrification kinetics by even a slight oxygenation excess.

Adjustment of the Ammoniac Set Point Over Time ($NO_3$/$NH_4$ Cascade Loop)

Figure 6:
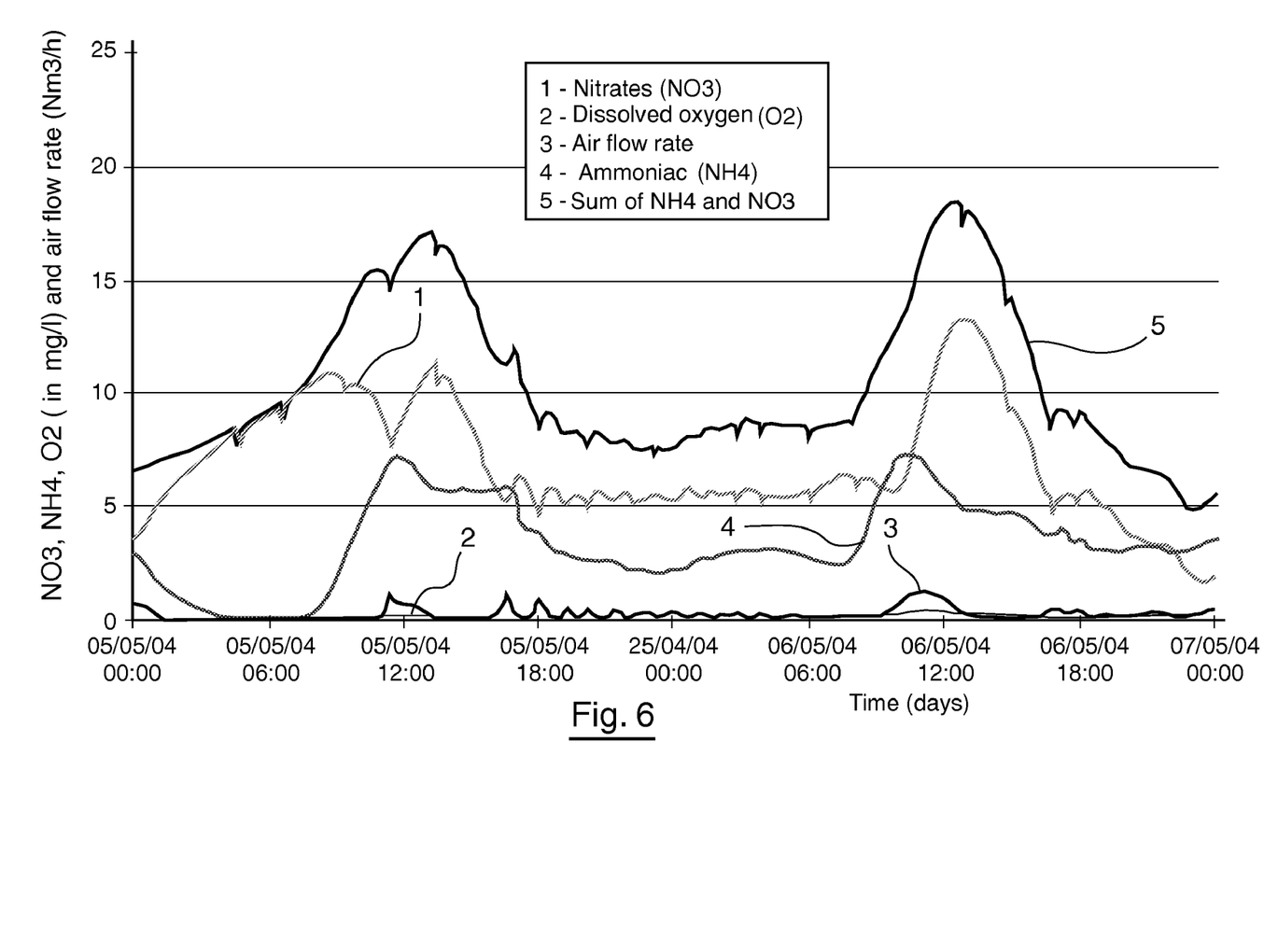
FIG. 6 is a graph showing the simultaneous nitrification/denitrification regulation by a cascade of $NO_3$ and $NH_4$ regulators.

The cascade regulation enables the ammoniac treatment objectives to be continuously adjusted. FIG. 6 shows the effects of the cascade regulation of $NO_3$ and $NH_4$ concentrations. A decrease in the nitrate peak values is observed by comparison with FIG. 5, under similar treatment conditions.

In this test, the maximum threshold established on the nitrate concentration in the treated water was 6 $mg-N-NO_3/L$.

The effects of the regulator are evaluated by the variations in the ammoniac concentrations in order to adapt the set points to the treatment conditions.

Indeed, the NH4 set points (between 2 and 6 $mg-N-NH_4/L$) change over the course of the day in order to adjust to denitrification possibilities. Thus, during the peak period (morning), the NH4 concentration of the water treated reaches 6 $mg-N-NH_4/L$.

By contrast, during the off-peak times, it approaches 2 $mg-N-NH_4/L$ with the maintenance of a nitrate concentration below 6 $mg-N-NO_3/L$. This example clearly shows the complementarity of the two nitrate and ammoniac measurements in order to optimize the simultaneous NDN.

Contributions of the Automatic Change in Aeration Mode

In spite of the continuous treatment set point adjustments by the cascade regulation ($NO_3$, $NH_4$), these improvements can sometimes be inadequate for certain treatment conditions: in particular for occasional high loads per unit of mass or volume.

Figure 7:
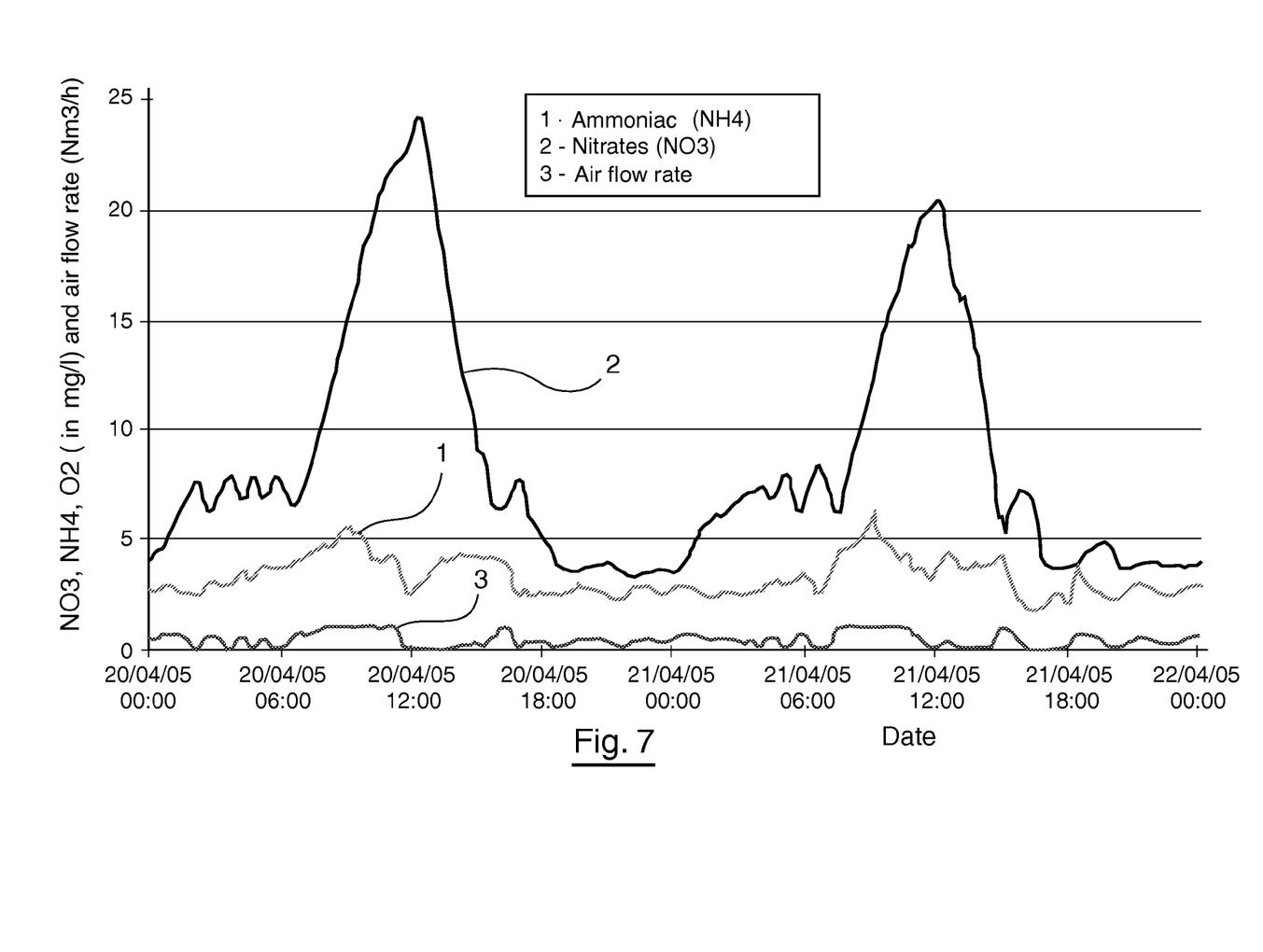
FIGS. 7 and 8 are graphs showing the nitrification/denitrification regulation by a combination of continuous and sequential aeration according to the invention.
Figure 8:
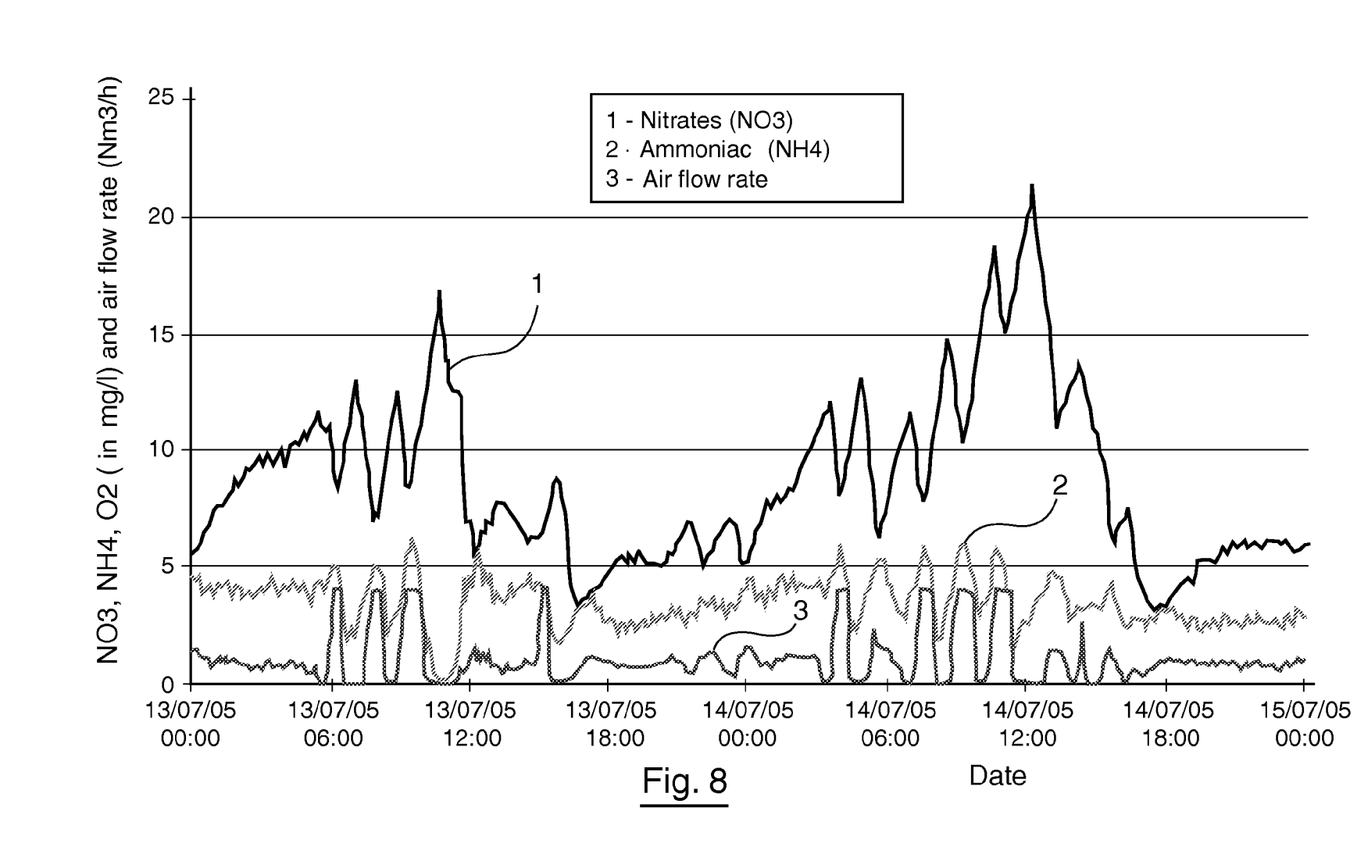

FIGS. 7 and 8 show the effects of a combination of sequential and continuous aeration. The regulator of the invention enables switching from one mode to the other according to the high and low nitrate thresholds.

Thus, periods of non-aeration are used, promoting denitrification when the applied loads do not enable satisfactory simultaneous NDN to be performed.

The results show that this can be the case for two to three hours per day. The benefit lies in the substantial decrease in the average nitrate concentration in the treated water. The observation of FIG. 8 confirms a reduction in the amplitude of the nitrate peaks during the peak period without adversely affecting the ammoniac value.

This system therefore provides additional strength to the performance of activated sludge tanks and other biological treatment processes, by enabling automatic fallback to classic aeration by means of a relevant indicator.

Figure 9:
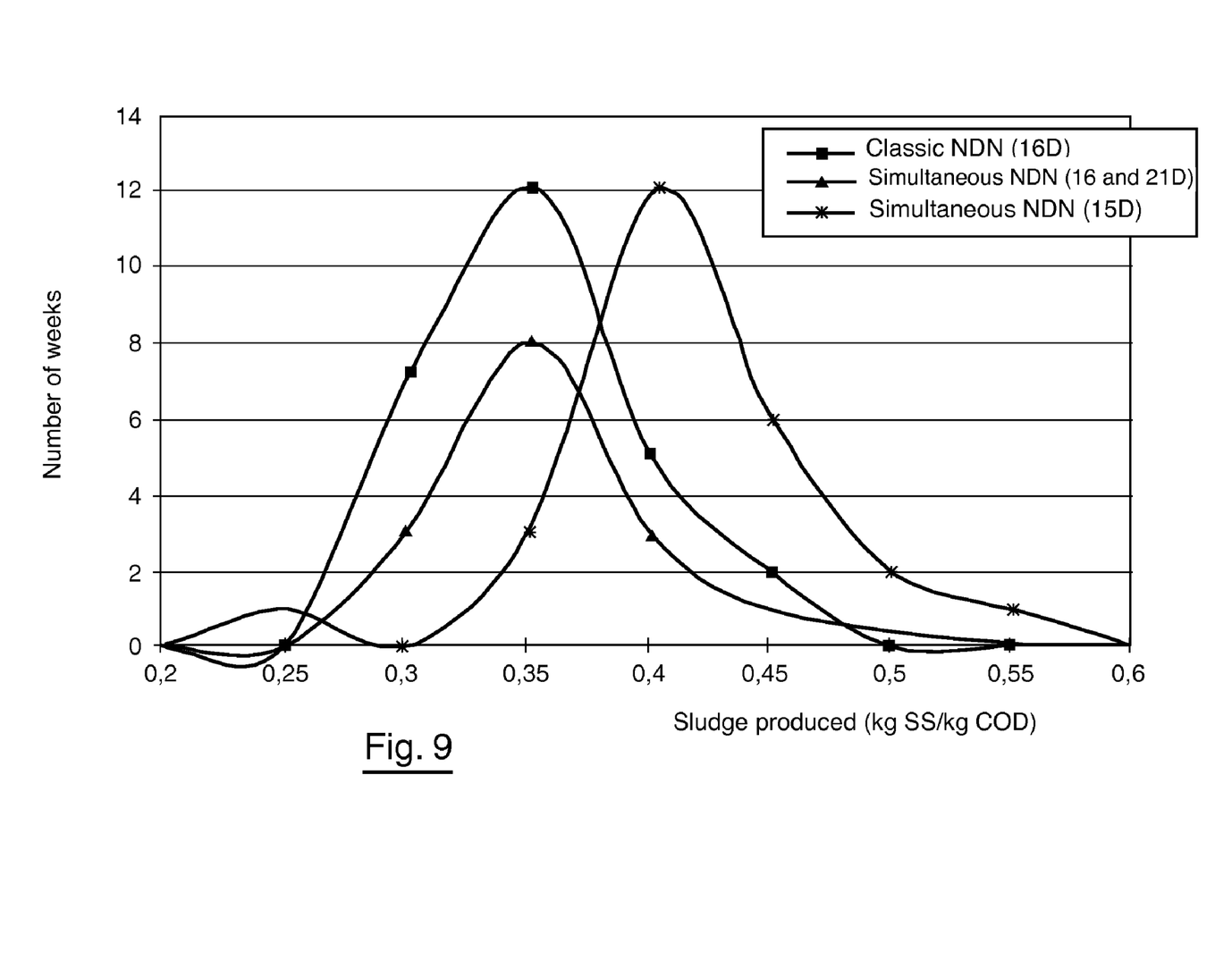
FIG. 9 is a graph showing the distribution of the number of days with a given sludge production according to different processes.

Moreover, an additional significant effect of the switch to the regulation mode of the invention was the reduction in sludge production. FIG. 9 shows the distribution of sludge productions (Number of weeks/Amount of sludge produced) for each configuration. It is observed that the switch to simultaneous NDN moves the barycenter of the distribution from 0.40 kg SS/kg COD to 0.35 kg SS/kg COD.

The values obtained correspond to a 13% decrease in the amount of sludge produced. In addition, if the mineral fraction associated with the physicochemical treatment of phosphorus, which is on the order of 0.1 kg SS/kg COD, is considered not to vary, a 17% reduction in the production of biological sludge is obtained. This enables the age of the sludge in the tank to be increased without being limited by the performances of the membrane filtration. The decrease in production is an significant advantage resulting from the application of said regulation principle.

The invention claimed is:

1. A method for removing nitrogen from water comprising:
   predetermining a high and a low threshold value for nitrate concentration in water;
   predetermining a high and a low threshold value for ammoniac concentration in water;

measuring the nitrate concentration in the water;
activating a continuous aeration mode if the nitrate concentration reaches the predetermined low threshold value for the nitrate concentration, wherein the continuous aeration mode comprises:
aerating the water such that nitrification and denitrification reactions occur simultaneously in the water;
activating a sequential aeration mode if the nitrate concentration reaches the predetermined high threshold value for the nitrate concentration, wherein in the sequential aeration mode comprises:
measuring the ammoniac concentration in the water;
stopping aeration when the ammoniac concentration reaches the predetermined low threshold value for the ammoniac concentration;
initiating aeration when the ammoniac concentration reaches the predetermined high threshold high for the ammoniac concentration; and
maintaining the sequential aeration mode until the nitrate concentration reaches the predetermined low threshold value for the nitrate concentration and then activating the continuous aeration mode.

2. The method of claim 1 further comprising:
during the continuous aeration mode, stopping aeration when the nitrate concentration reaches the predetermined high threshold value for the nitrate concentration and activating the sequential aeration mode.

3. The method of claim 1 further comprising automatically switching between the continuous aeration mode and the sequential aeration mode.

4. The method of claim 1 wherein the continuous aeration mode is activated when the nitrate concentration is approximately 4 mg/L.

5. The method of claim 1 wherein the sequential aeration mode is activated when the nitrate concentration is approximately 10 mg/L.

6. The method of claim 1 wherein during the continuous aeration mode the method further comprises:
determining a first nitrate set point;
calculating a first ammoniac set point based on the first nitrate set point;
calculating a first dissolved oxygen set point based on the calculated first ammoniac set point; and
wherein when the nitrate concentration in the water reaches the first nitrate set point the amount of dissolved oxygen in the water is adjusted to the first dissolved oxygen set point to restore equilibrium between the nitrification and denitrification reactions.

7. The method of claim 6 wherein after the amount of dissolved oxygen is adjusted to the first dissolved oxygen set point, the method further comprises maintaining the first ammoniac set point for a first period of time.

8. The method of claim 7 further comprising maintaining the first dissolved oxygen set point for a second period of time.

9. The method of claim 8 wherein the first period of time is not equal to the second period of time.

10. The method of claim 6 further comprises:
determining a second nitrate set point that is higher than the first nitrate set point;
calculating a second ammoniac set point based on the second nitrate set point, the second ammoniac set point being higher than the first ammoniac set point;
calculating a second dissolved oxygen set point based on the calculated second ammoniac set point; and
wherein when the nitrate concentration in the water reaches the second nitrate set point, the amount of dissolved oxygen in the water is reduced to the second dissolved oxygen set point to restore equilibrium between the nitrification and denitrification reactions.

11. The method of claim 1 wherein during the sequential aeration mode, stopping of aeration occurs if the ammoniac concentration is below the predetermined low threshold value for the ammoniac concentration and the water has been aerated for a predetermined amount of time.

12. The method of claim 1 wherein during the sequential aeration mode, aeration occurs if the ammoniac concentration is above the predetermined high threshold high for the ammoniac concentration and the water has not been aerated for a predetermined amount of time.

13. The method of claim 6 further comprising:
directing water into a bioreactor;
directing water from the bioreactor to a membrane filtration zone; and
wherein measuring the nitrate concentration in the water occurs after the water has been treated in the membrane filtration zone.

14. The method of claim 1 further comprising:
directing water into a bioreactor;
directing water from the bioreactor to a membrane filtration zone;
wherein measuring the nitrate concentration in the water occurs after the water has been treated in the membrane filtration zone;
wherein during the continuous aeration mode the method further comprises:
determining first and second nitrate set points, the second nitrate set point being higher than the first nitrate set point;
calculating first and second ammoniac set points based on the first and second nitrate set points respectively, the second ammoniac set point being higher than the first ammoniac set point;
calculating first and second dissolved oxygen set points based on the calculated first and second ammoniac set points respectively; and
wherein when the nitrate concentration in the water reaches the first nitrate set point, the amount of dissolved oxygen in the water is increased to the first dissolved oxygen set point and when the nitrate concentration in the water reaches the second nitrate set point, the amount of dissolved oxygen in the water is reduced to the second dissolved oxygen set point.

15. The method of claim 14 wherein:
during the sequential aeration mode, stopping of aeration occurs if the ammoniac concentration is below the predetermined low threshold value for the ammoniac concentration and the water has been aerated for a predetermined amount of time;
during the sequential aeration mode, aeration occurs if the ammoniac concentration is above the predetermined high threshold high for the ammoniac concentration and the water has not been aerated for a predetermined amount of time.

16. A method of biologically removing nitrogen from water by nitrifying and denitrifying the water, the method comprising:
employing a continuous aeration mode and a sequential aeration mode wherein in the continuous aeration mode nitrifying and denitrifying reactions occur simultaneously in the water and wherein in the sequential aeration mode aeration is activated and deactivated;

activating the continuous aeration mode when the nitrate concentration in the water reaches a predetermined low threshold;

activating the sequential aeration mode when the nitrate concentration in the water reaches a predetermined high threshold; and wherein when in the sequential aeration mode, aeration is deactivated when the ammoniac concentration reaches a predetermined low threshold and aeration is activated when the ammoniac concentration reaches a predetermined high threshold.

17. The method of claim 16 including activating the continuous aeration mode when the nitrate concentration decreases to a threshold of approximately 4 mg/l.

18. The method of claim 17 including activating the sequential aeration mode when the nitrate concentration in the water increases to a threshold of approximately 10 mg/l.

19. The method of claim 16 including limiting the time period of aeration during the sequential aeration mode.

20. The method of claim 16 wherein the continuous aeration mode involves a method of predictive control of the nitrate and ammoniac concentrations in the water.

21. The method of claim 20 wherein the predictive control method includes successive steps of regulating an ammoniac set point to be reached according to a nitrate set point to be reached.

22. The method of claim 21 wherein said predictive control method includes successive steps of regulating an aeration set point when said nitrate concentration reaches a predetermined high threshold.

23. The method of claim 22 wherein the steps of regulating the ammoniac set point and the step of regulating the aeration set point are timed.

24. The method of claim 23 wherein the steps of regulating the ammoniac set point and regulating the aeration set points are timed and staggered in time with respect to one another.

25. The method of claim 16 including calculating a first ammoniac set point based on a first nitrate set point; calculating a first aeration set point based on the calculated ammoniac set point; and wherein when the nitrate concentration in the water reaches the first nitrate set point, the aeration in the water is adjusted to the first aeration set point to restore equilibrium between the nitrification and denitrification reactions.

26. The method of claim 25 wherein after the aeration is adjusted to the first aeration set point, the method further includes maintaining the first ammoniac set point for a first period of time.

27. The method of claim 26 further including maintaining the first aeration set point for a second period of time.

28. The method of claim 25 further including:
calculating a second set ammoniac set point based on a second nitrate set point, the second ammoniac set point being higher than the first ammoniac set point;
calculating a second aeration set point based on the calculated second ammoniac set point; and
wherein when the nitrate concentration in the water reaches the second nitrate set point, the amount of aeration in the water is reduced to the second aertaion set point to generally restore equilibrium between the nitrification and denitrification reactions.

29. The method of claim 16 wherein during the continuous aeration mode the method includes:
determining first and second nitrate set points where the second nitrate set point is higher than the first nitrate set point;
calculating first and second ammoniac set points based on the first and second nitrate set points, respectively, the second ammoniac set point being higher than the first ammoniac set point;
calculating first and second aeration set points based on the calculated first and second ammoniac set points, respectively; and
wherein when the nitrate concentration in the water reaches the first nitrate set point, the amount of aeration in the water is increased to the first aeration set point and wherein when the nitrate concentration in the water reaches the second nitrate set point, the amount of aeration in the water is reduced to the second aeration set point.

30. The method of claim 29 wherein:
during the sequential aeration mode, ceasing aeration if the ammoniac concentration is below the predetermined low threshold value for the ammoniac concentration and the water has been aerated for a predetermined amount of time; and
during the sequential aeration mode, activating aeration if the ammoniac concentration is above the predetermined high threshold value for the ammoniac concentration and the water has been aerated for a predetermined amount of time.

* * * * *